United States Patent
Fukuoka (10) Patent No.: US 9,262,007 B2
(45) Date of Patent: Feb. 16, 2016

(54) OPERATION INPUT DEVICE, AND INFORMATION PROCESSING APPARATUS PROVIDED WITH THE SAME

(71) Applicant: KYOCERA Document Solutions Inc., Osaka-shi, Osaka (JP)

(72) Inventor: Junichi Fukuoka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 131 days.

(21) Appl. No.: 14/137,614

(22) Filed: Dec. 20, 2013

(65) Prior Publication Data
US 2014/0184540 A1 Jul. 3, 2014

(30) Foreign Application Priority Data

Dec. 28, 2012 (JP) ................................ 2012-286971

(51) Int. Cl.
*G06F 3/041* (2006.01)
*G06F 3/01* (2006.01)
*G06F 3/0488* (2013.01)

(52) U.S. Cl.
CPC ............. *G06F 3/0416* (2013.01); *G06F 3/016* (2013.01); *G06F 3/04886* (2013.01)

(58) Field of Classification Search
CPC ................................ G06F 3/016; G06F 3/0416
USPC .......................................................... 345/173
See application file for complete search history.

(56) References Cited

U.S. PATENT DOCUMENTS

| | | | | |
|---|---|---|---|---|
| 2005/0054390 A1* | 3/2005 | Tuovinen | ................... | 455/575.1 |
| 2009/0066666 A1* | 3/2009 | Sagou | ........................... | 345/173 |
| 2010/0156823 A1* | 6/2010 | Paleczny et al. | ............... | 345/173 |
| 2010/0253652 A1* | 10/2010 | Homma et al. | ................ | 345/177 |
| 2010/0315359 A1* | 12/2010 | Seong et al. | ................... | 345/173 |
| 2011/0043477 A1* | 2/2011 | Park et al. | ....................... | 345/174 |
| 2011/0134061 A1* | 6/2011 | Lim | .............................. | 345/173 |
| 2011/0134063 A1* | 6/2011 | Norieda | ........................ | 345/173 |
| 2011/0157052 A1* | 6/2011 | Lee et al. | ....................... | 345/173 |
| 2011/0285517 A1* | 11/2011 | Lam | ........................... | 340/407.2 |

FOREIGN PATENT DOCUMENTS

JP 2008-065518 A 3/2008
JP 2011-210147 A 10/2011

* cited by examiner

*Primary Examiner* — Viet Pham
(74) *Attorney, Agent, or Firm* — Alleman Hall McCoy Russell & Tuttle LLP (57) ABSTRACT

An operation input device includes touch panel, depression time detecting portion, input determination portion, display control portion, sound control portion, vibration portion, and vibration control portion. Touch panel outputs a depression signal according to a depression time when an input region is depressed. The depression time detecting portion detects the depression time based upon the depression signal from the touch panel. Input determination portion determines input content according to the depression time detected by the depression time detecting portion. Display control portion outputs visual information, which corresponds to the input content determined by input determination portion, to a display portion of the touch panel. Sound control portion outputs sound corresponding to the input content determined by input determination portion. Vibration portion transmits vibration to touch panel. Vibration control portion vibrates touch panel by vibration portion according to a vibration pattern corresponding to the input content determined by input determination portion.

16 Claims, 9 Drawing Sheets

| SET ITEM (INITIAL VALUE) | TOUCH KEY | DEPRESSION TIME [SEC] | INPUT CANDIDATE FOR SET VALUE | |
|---|---|---|---|---|
| ENLARGE/REDUCE (100%) | K11 | 0 | 25% | ⎫ |
| | K11 | 1 | 50% | |
| | K11 | 2 | 75% | L1 |
| | K11 | 3 | 100% | |
| | K11 | 4 | 125% | |
| | K11 | 5 | 150% | ⎭ |
| CONCENTRATION (NORMAL) | K12 | 0 | LIGHTER | ⎫ |
| | K12 | 1 | LIGHT | L2 |
| | K12 | 2 | NORMAL | |
| | K12 | 3 | DARK | ⎭ |
| DOCUMENT SIZE MIXED LOADING (NO) | K13 | 0 | YES | ⎫ L3 |
| | K13 | 1 | NO | ⎭ |
| DISCHARGE DESTINATION (INTERNAL TRAY) | K14 | 0 | FINISHER TRAY | ⎫ |
| | K14 | 1 | JOB SEPARATOR TRAY | L4 |
| | K14 | 2 | INTERNAL TRAY | ⎭ |
| ⋮ | ⋮ | ⋮ | ⋮ | |

| CHARACTER | TOUCH KEY (INPUT CANDIDATE FOR SET VALUE) | | | | | | | | | | | |
|---|---|---|---|---|---|---|---|---|---|---|---|---|
| DEPRESSION TIME [SEC] | K21 | K22 | K23 | K24 | K25 | K26 | K27 | K28 | K29 | K30 | K31 | K32 |
| 0 | A | KA | SA | TA | NA | HA | MA | YA | RA | WA | N | 1 |
| 1 | I | KI | SHI | CHI | NI | HI | MI | LYA | RI | WI | ゛ | 2 |
| 2 | U | KU | SU | TSU | NU | FU | MU | YU | RU | U | ゜ | 3 |
| 3 | E | KE | SE | TE | NE | HE | ME | LYU | RE | WE | ○ | 4 |
| 4 | O | KO | SO | TO | NO | HO | MO | YO | RO | WO | 、 | 5 |
| 5 | – | – | – | LTU | – | – | – | LYO | – | – | – | 6 |
| 6 | – | – | – | – | – | – | – | – | – | – | – | 7 |
| 7 | – | – | – | – | – | – | – | – | – | – | – | 8 |
| 8 | – | – | – | – | – | – | – | – | – | – | – | 9 |
| 9 | – | – | – | – | – | – | – | – | – | – | – | 0 |

Fig. 9

OPERATION INPUT DEVICE, AND INFORMATION PROCESSING APPARATUS PROVIDED WITH THE SAME

INCORPORATION BY REFERENCE

This application is based upon and claims the benefit of priority from the corresponding Japanese Patent Application No. 2012-286971 filed on Dec. 28, 2012, the entire contents of which are incorporated herein by reference.

BACKGROUND

The present disclosure relates to an operation input device that can determine an input content from a touch feeling, and an information processing apparatus provided with the operation input device.

A touch panel is used as an operation input device that performs various operation inputs to an information processing apparatus such as a copying machine, a facsimile device, a scanner device, a multifunction peripheral, a personal computer, and a tablet terminal. In the information processing apparatus of this type, an input process is executed when a user operates each operation key corresponding to each of various functions displayed on the touch panel. However, in the information processing apparatus described above, it is necessary to find and depress a desired operation key, and to confirm whether the input content is correct or not on a display screen. Therefore, a user who is unfamiliar with an operation of the information processing apparatus or a user who operates the touch panel while simultaneously doing another work is sometimes difficult to operate the information processing apparatus.

There has conventionally been known a method of allowing a user to determine an input content from a change in a vibration pattern according to a time when a touch panel is depressed. In addition, there has conventionally been known a method of processing information corresponding to a number of times of vibration of a terminal device from the start of the operation by the user till the end of the operation, according to the number of times of vibration, in order to simplify a user's operation.

SUMMARY

An operation input device according to one aspect of the present disclosure includes a touch panel, a depression time detecting portion, an input determination portion, a display control portion, a sound control portion, a vibration portion, and a vibration control portion. The touch panel outputs a depression signal according to a depression time when an input region is depressed. The depression time detecting portion detects the depression time based upon the depression signal from the touch panel. The input determination portion determines an input content according to the depression time detected by the depression time detecting portion. The display control portion outputs visual information, which corresponds to the input content determined by the input determination portion, to a display portion of the touch panel. The sound control portion outputs sound corresponding to the input content determined by the input determination portion. The vibration portion transmits vibration to the touch panel. The vibration control portion vibrates the touch panel by the vibration portion according to a vibration pattern corresponding to the input content determined by the input determination portion.

An information processing apparatus according to another aspect of the present disclosure includes a touch panel, a depression time detecting portion, an input determination portion, a display control portion, a sound control portion, a vibration portion, and a vibration control portion. The touch panel outputs a depression signal according to a depression time when an input region is depressed. The depression time detecting portion detects the depression time based upon the depression signal from the touch panel. The input determination portion determines an input content according to the depression time detected by the depression time detecting portion. The display control portion outputs visual information, which corresponds to the input content determined by the input determination portion, to a display portion of the touch panel. The sound control portion outputs sound corresponding to the input content determined by the input determination portion. The vibration portion transmits vibration to the touch panel. The vibration control portion vibrates the touch panel by the vibration portion according to a vibration pattern corresponding to the input content determined by the input determination portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described in detail based on the drawings.

<Schematic Configuration of Multifunction Peripheral 100>

The schematic configuration of the multifunction peripheral 100 (one example of an information processing apparatus) according to the embodiment of the present disclosure will firstly be described with reference to FIG. 1. The upper drawing in FIG. 1 is a schematic sectional view of the multifunction peripheral 100, and the lower drawing in FIG. 1 is a view viewed from a line A-A in the upper drawing in FIG. 1.

The multifunction peripheral 100 is an image forming apparatus including an image reading portion 1, an ADF 2, an image forming portion 3, a sheet feeding portion 4, a control portion 5, an operation display portion 6 (one example of an operation input device), and a speaker 64. In the present embodiment, the multifunction peripheral 100 is described as one example of the information processing apparatus according to the present disclosure. However, the information processing apparatus is not limited thereto. For example, the present disclosure is applicable to an information processing apparatus such as a printer, a facsimile device, a scanner, a personal computer, a smartphone, a tablet terminal, or a PDA (Personal Digital Assistant).

The image reading portion 1 includes a document cover 20, a contact glass 11, a reading unit 12, mirrors 13 and 14, an optical lens 15, and a CCD (Charge Coupled Device) 16. The contact glass 11 is provided on the top surface of the image reading portion 1, and is a transparent document table on which a document P as an image reading target by the multifunction peripheral 100 is placed. The document cover 20 covers the contact glass 11, according to need. The image reading portion 1 is controlled by the control portion 5, thereby reading image data from the document P placed on the contact glass 11.

Figure 1:
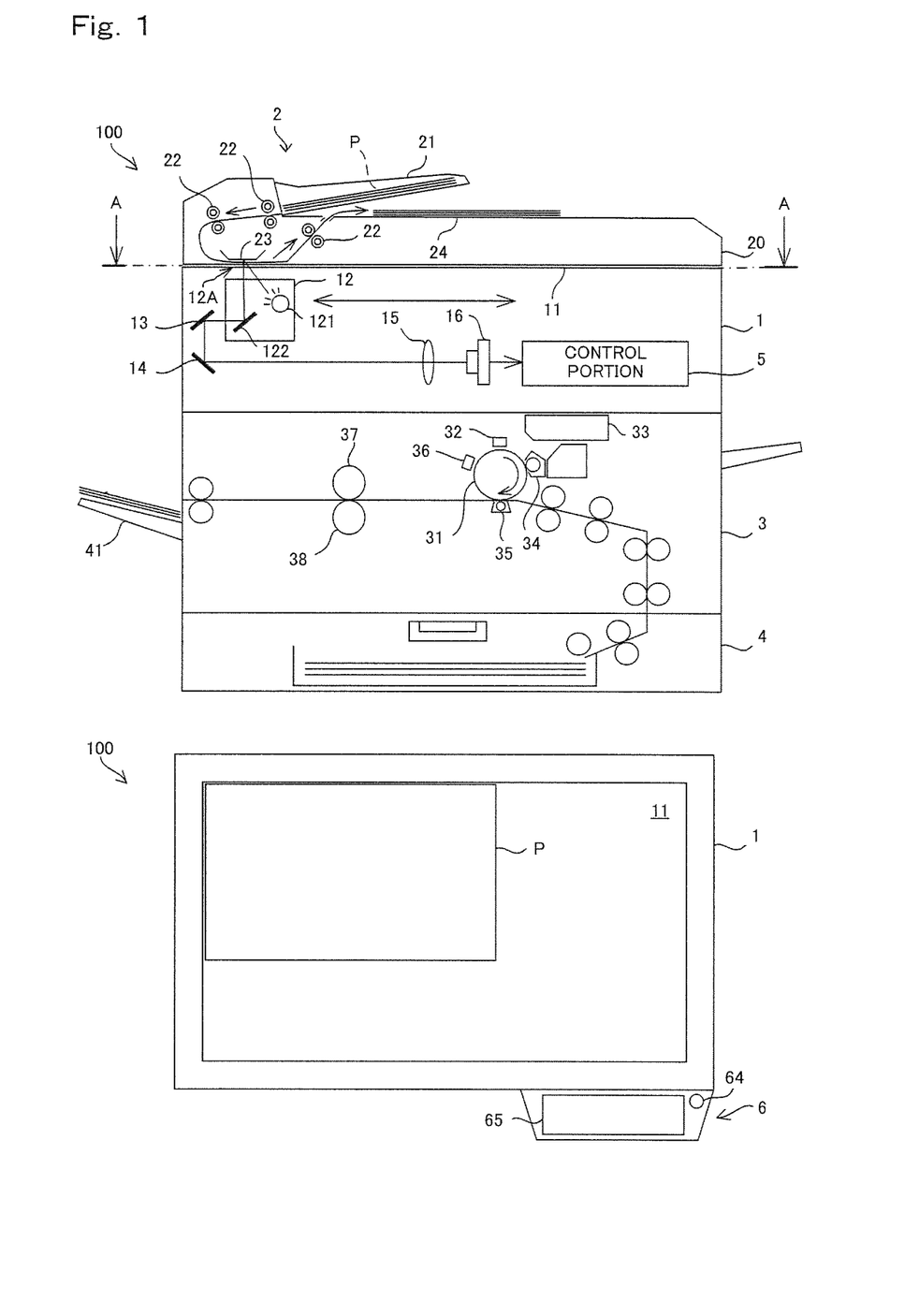
FIG. 1 is a view showing a schematic configuration of a multifunction peripheral according to an embodiment of the present disclosure.

The reading unit 12 includes an LED light source 121 and a mirror 122, and is configured to be movable in a lateral direction (in a sub-scanning direction) in the upper drawing in FIG. 1 by a moving mechanism, not shown, using a drive motor such as a stepping motor. When the reading unit 12 moves in the sub-scanning direction by the drive motor, the contact glass 11 is scanned with light emitted from the LED light source 121 toward the contact glass 11 in the sub-scanning direction.

The LED light source 121 includes a lot of white LEDs arranged along a direction (a main scanning direction) perpendicular to a sheet surface of the upper drawing in FIG. 1 in the multifunction peripheral 100. The LED light source 121 emits white light for one line toward the document P located at a reading position 12A on the contact glass 11. The reading position 12A moves in the sub-scanning direction with the movement of the reading unit 12 in the sub-scanning direction.

The mirror 122 reflects, toward the mirror 13, light reflected when the LED light source 121 emits light toward the document P on the reading portion 12A. The light reflected by the mirror 122 is guided to the optical lens 15 by the mirrors 13 and 14. The optical lens 15 collects the incident light, and introduces the converged light to the CCD 16.

The CCD 16 is a photoelectric conversion element that converts the received light into an electric signal (voltage) according to the quantity of the received light and outputs the electric signal as image data. Specifically, the CCD 16 reads the image data of the document P based upon the light reflected from the document P when the LED light source 121 emits light. The image data read by the CCD 16 is inputted to the control portion 5.

The ADF 2 is provided on the document cover 20. The ADF 2 is an automatic document feeder including a document set portion 21, plural conveyance rollers 22, a document holder 23, and a sheet discharge portion 24. The ADF 2 allows the document P set on the document set portion 21 to pass through the reading position 12A on the contact glass 11 to be conveyed to the sheet discharge portion 24 by driving the conveyance rollers 22 with a stepping motor, not shown. In this case, the image data is read from the document P passing through the reading position 12A by the image reading portion 1.

The document holder 23 is provided at a position above the reading position 12A on the contact glass 11 with a space through which the document P can pass. The document holder 23 is formed to be long in the main scanning direction, and a white sheet is adhered on its lower surface (the surface close to the contact glass 11). In the multifunction peripheral 100, image data of the white sheet is read as white reference data. The white reference data is used for a known shading correction or other process.

The image forming portion 3 executes an image forming process (printing process) according to an electrophotographic system based upon image data read by the image reading portion 1 or image data inputted from an information processing apparatus such as an external personal computer. Specifically, the image forming portion 3 includes a photosensitive drum 31, a charging device 32, an LSU 33, a developing device 34, a transfer roller 35, an electricity removing device 36, a fixing roller 37, and a pressure roller 38. In the image forming portion 3, an image is formed on a sheet conveyed by the sheet feeding portion 4 in a procedure described below, and the sheet after the image formation is discharged onto a sheet discharge tray 41.

Firstly, the photosensitive drum 31 is charged to have a uniform potential by the charging device 32. Next, light is emitted to the surface of the photosensitive drum 31 from the LSU 33 according to image data. Thus, an electrostatic latent image is formed on the surface of the photosensitive drum 31. Thereafter, the electrostatic latent image on the photosensitive drum 31 is developed (made visible) as a toner image by the developing device 34. Then, the toner image formed on the photosensitive drum 31 is transferred onto a sheet by the transfer roller 35. The toner image transferred onto the sheet is then heated by the fixing roller 37, and fused and fixed onto the sheet, when the sheet passes between the fixing roller 37 and the pressure roller 38, and is discharged. The potential of the photosensitive drum 31 is removed by the electricity removing device 36.

The control portion 5 includes control devices such as a CPU, a ROM, a RAM, and an EEPROM. The control portion 5 performs overall control of the multifunction peripheral 100 by executing a predetermined control program stored in the ROM by the CPU. The RAM is a volatile storage medium, and the EEPROM is a non-volatile storage medium, and they are used as temporary storage memories for various processes executed by the CPU. The control portion 5 may be composed of an electronic circuit such as an integrated circuit (ASIC, DSP), or may be a control portion provided separately from a main control portion generally controlling the multifunction peripheral 100.

The speaker 64 outputs sound based upon an inputted sound signal. The speaker 64 is provided on a position where a user can easily catch a predetermined sound. In the present embodiment, the speaker 64 is provided on the right side on the top surface of the operation display portion 6 in the lower drawing in FIG. 1. In the present embodiment, the speaker 64 outputs sound (such as beep or voice) according to the content inputted to the operation display portion 6 by the display control portion 60. Even the case in which the multifunction peripheral 100 does not have the speaker 64 and is configured to allow the speaker 64 to be connected thereto with a LAN cable or a USB cable is one example of the information processing apparatus according to the present disclosure. The case in which the multifunction peripheral 100 that does not include the speaker 64 transmits a sound signal to the speaker 64 located close to the multifunction peripheral 100, with a wireless communication such as Bluetooth (registered trademark) or infrared ray communication to allow the speaker 64 to output sound is also one example of the information processing apparatus according to the present disclosure.

<Schematic Configuration of Operation Display Portion 6>

Figure 2:
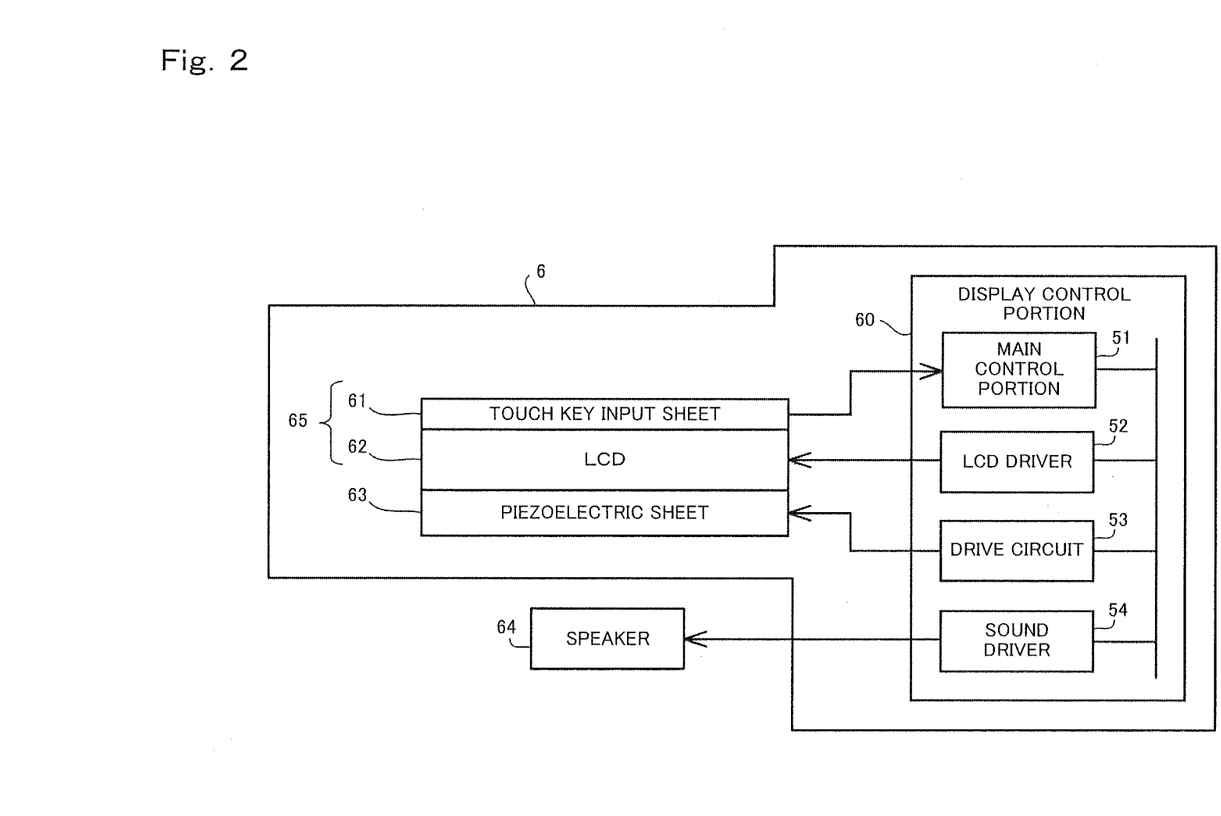
FIG. 2 is a diagram showing a schematic configuration of an operation display portion according to the embodiment of the present disclosure.
Figure 3:
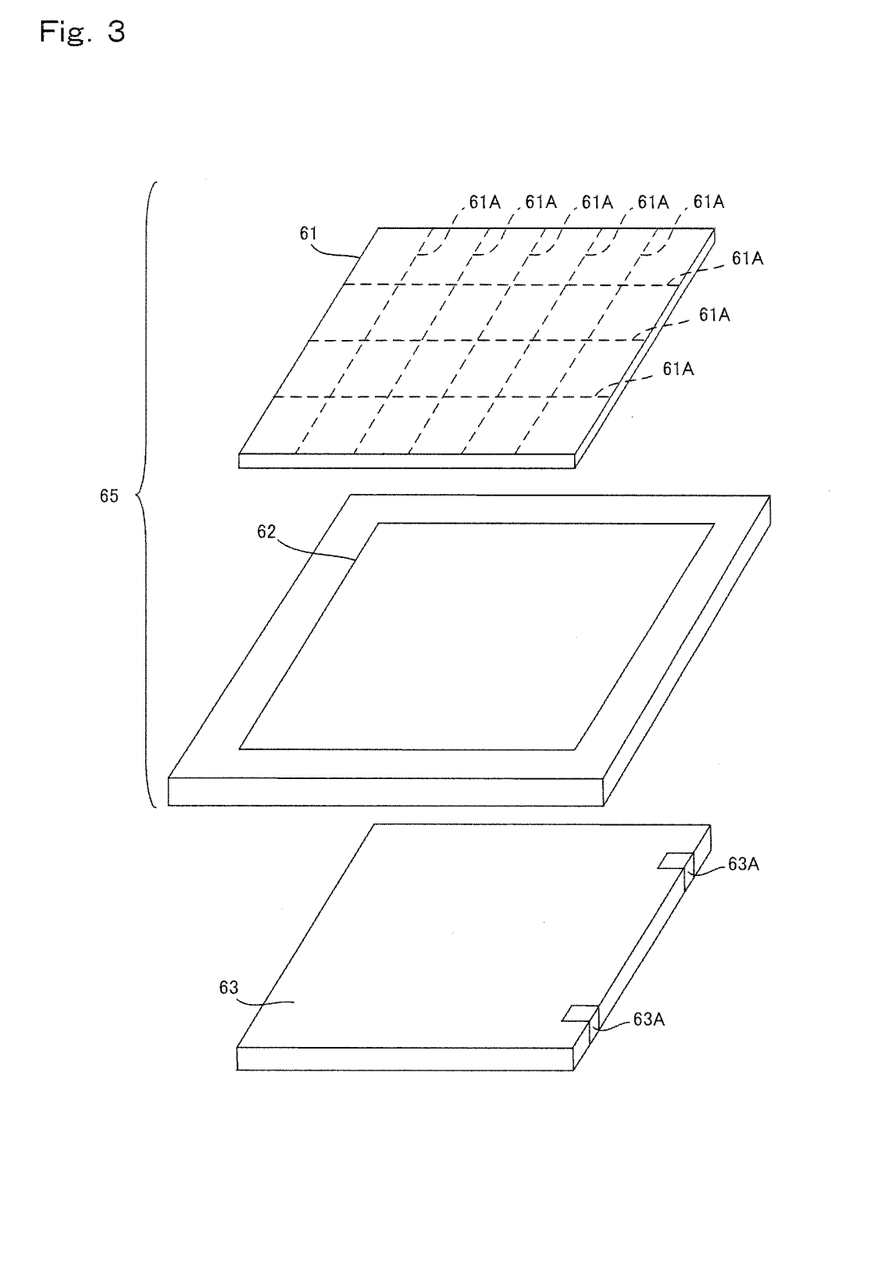
FIG. 3 is a view showing a schematic configuration of the operation display portion shown in FIG. 2.

The schematic configuration of the operation display portion 6 will be described next with reference to FIGS. 2 and 3. FIG. 2 is a diagram showing the schematic configuration of the operation display portion 6. FIG. 3 is an exploded perspective view schematically showing the schematic configuration of the operation display portion 6. As shown in FIG. 2, the operation display portion 6 includes a touch panel 65, a piezoelectric sheet 63 (one example of a vibration portion), and the display control portion 60. The touch panel 65 includes a touch key input sheet 61 and an LCD (Liquid Crystal Display) 62. The touch key input sheet 61, the LCD 62, and the piezoelectric sheet 63 are arranged in close contact with one another.

The display control portion 60 includes a main control portion 51 (one example of a depression time detecting portion and an input determination portion), an LCD driver 52 (one example of a display control portion), a drive circuit 53 (one example of a vibration control portion), and a sound driver 54 (one example of a sound control portion). A configuration in which the LCD driver 52, the drive circuit 53, and the sound driver 54 are realized by the main control portion 51 may be applied.

The touch key input sheet 61 outputs a depression signal according to a depression time when an input region is depressed. The depression signal is a voltage signal indicating a HIGH-level voltage when the input region is depressed, and indicating a LOW-level voltage when the input region is not depressed. The touch key input sheet 61 also outputs address information indicating a depressed input position to the main control portion 51 together with the depression signal for each input region. The touch key input sheet 61 is arranged on the surface of the operation display portion 6. The touch key input sheet 61 is configured such that the display portion of the LCD 62 is transparent in order to allow a user to see a display content on the LCD 62. For example, the touch key input sheet 61 is a projected capacitive type for detecting an input position (address information) from a change in capacitance. As shown in FIG. 3, the touch key input sheet 61 of a projected capacitive type includes matrix transparent electrodes 61A patterned in a longitudinal direction and in a lateral direction, and detects capacitive coupling generated on a position of the transparent electrode 61A touched by a finger, as the depression. The touch key input sheet 61 is of course not limited to the projected capacitive type touch panel.

The LCD 62 displays image information inputted from the control portion 5 and the main control portion 51 by the LCD driver 52. The LCD 62 is a display portion of the touch panel 65, and is arranged in close contact with the back surface of the touch key input sheet 61. The LCD 62 is configured such that special liquid is filled between two glass plates. An orientation of a liquid crystal molecule is changed due to an application of a voltage to increase or decrease light transmittance, whereby an image is displayed. The display portion of the touch panel 65 is not limited to the LCD 62. For example, an organic EL (Organic Electro Luminescence) display may be used instead of the LCD 62.

The piezoelectric sheet 63 transmits vibration to the touch panel 65. The piezoelectric sheet 63 is made of a piezo film, and entirely vibrates with an intensity according to an AC voltage applied to the electrode 63A. The piezo film has a property of changing the intensity of the vibration or the vibration frequency when the frequency or the amplitude of the applied AC voltage is changed. The piezo film vibrates only when an AC voltage is inputted, and does not vibrate in the case of a constant voltage or no input voltage.

The piezoelectric sheet 63 is vibrated by the drive circuit 53 according to a vibration pattern inputted from the main control portion 51. The piezoelectric sheet 63 is arranged in close contact with the back surface of the LCD 62. If the piezoelectric sheet 63 has transparency, the piezoelectric sheet 63 may be arranged on the front surface of the LCD 62.

The LCD driver 52 allows the LCD 62 to display an image by outputting a voltage signal to each cell in the LCD 62 at a timing set beforehand by the control portion 5 and the main control portion 51. In the present embodiment, the LCD driver 52 outputs visual information corresponding to the input content determined by the main control portion 51 to the LCD 62 arranged in close contact with the back surface of the touch key input sheet 61. More specifically, the LCD driver 52 outputs the visual information to the LCD 62 serving as the display portion of the touch panel 65, every time the input content is selected by the main control portion 51.

The drive circuit 53 vibrates the touch panel 65 by the piezoelectric sheet 63 according to the vibration pattern corresponding to the input content determined by the main control portion 51. More specifically, the drive circuit 53 vibrates the touch panel 65 by the piezoelectric sheet 63, every time the main control portion 51 selects an input content. When a signal indicating a vibration period, a vibration intensity, and a vibration pattern is inputted from the main control portion 51, the drive circuit 53 applies an AC voltage with a voltage value and a frequency corresponding to the inputted signal to the piezoelectric sheet 63.

The drive circuit 53 also vibrates the piezoelectric sheet 63 by the main control portion 51 with a vibration pattern set beforehand. For example, the main control portion 51 vibrates the piezoelectric sheet 63 by the drive circuit 53 by 0.2 second in accordance with the depression time of the touch key input sheet 61, every time an input content is selected.

The sound driver 54 outputs sound corresponding to the input content determined by the main control portion 51 from the speaker 64. More specifically, the sound driver 54 outputs sound from the speaker 64, every time an input content is selected by the main control portion 51. When sound data is inputted from the main control portion 51, the sound driver 54 generates a sound signal corresponding to the inputted sound data, and outputs the sound signal to the speaker 64.

The main control portion 51 includes the CPU, the RAM, the ROM, and the EEPROM, and controls the operation of the operation display portion 6 by executing the predetermined program stored in the ROM by the CPU. The RAM is a volatile storage medium, and the EEPROM is a non-volatile storage medium, and they are used as temporary storage memories for various processes executed by the CPU. The main control portion 51 may be composed of an electronic circuit such as an integrated circuit (ASIC, DSP). The configuration in which the control portion 5 has the function of the main control portion 51 is considered as another application example.

Figure 6:
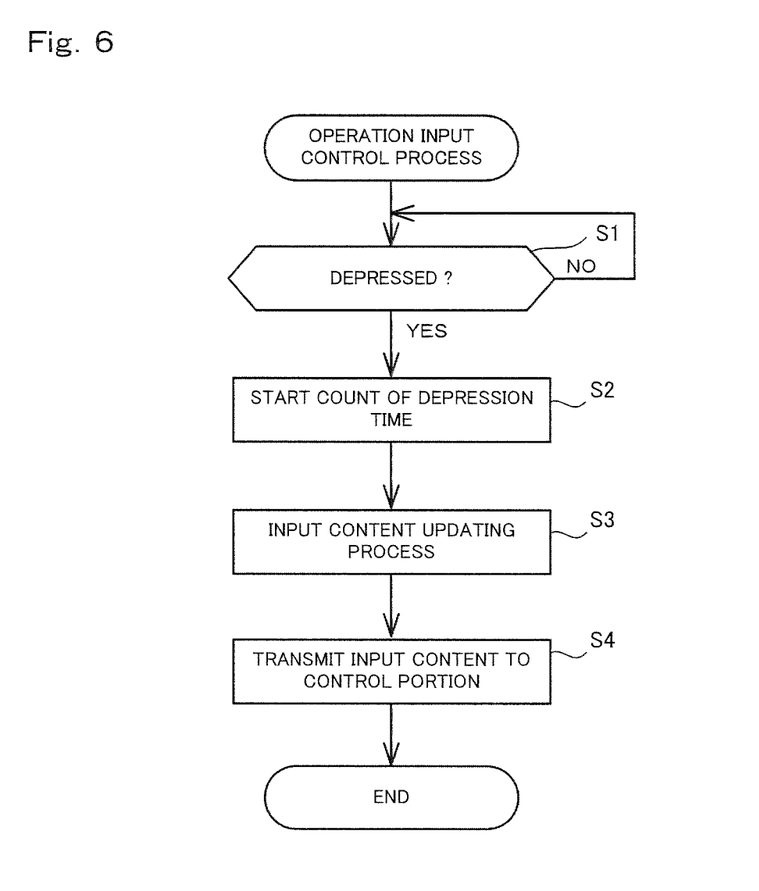
FIG. 6 is a flowchart showing one example of a procedure of an operation input control process.
Figure 7:
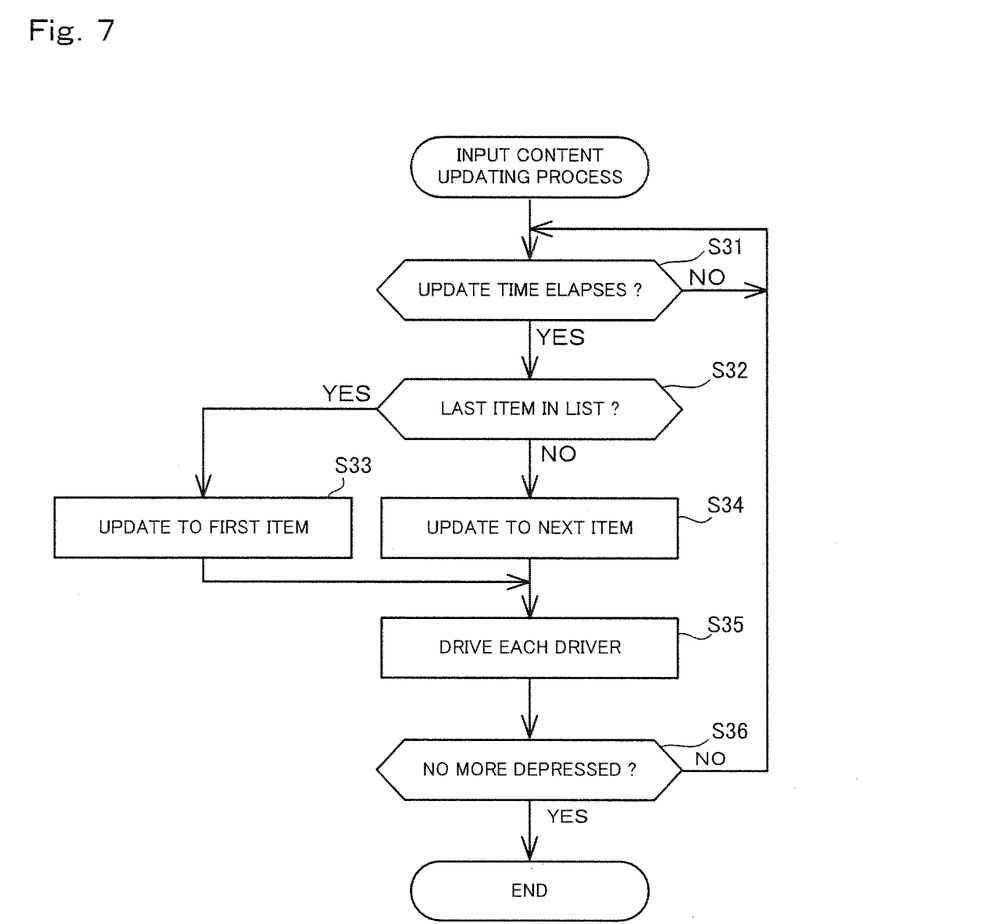
FIG. 7 is a flowchart showing one example of a procedure of the input content updating process.

An operation input using the touch key input sheet 61 is performed by the main control portion 51 executing a later-described operation input control process (see FIGS. 6 and 7).

In the present embodiment, the main control portion 51 performs various operation inputs when touch keys K11 to K14 (see FIG. 4) displayed on the touch panel 65 are respectively operated by a user. More specifically, the main control portion 51 selects an input content from input candidates (see FIG. 5) for later-described plural set values corresponding to the touch keys K11 to K14 specified by the address information from the touch key input sheet 61, in accordance with the depression time. The touch key is a combination of the display of the LCD 62 and the touch key input sheet 61, and is displayed in a predetermined region on the display screen of the touch panel 65 by the main control portion 51. The touch key corresponds to an input region according to the present disclosure.

Figure 4A:
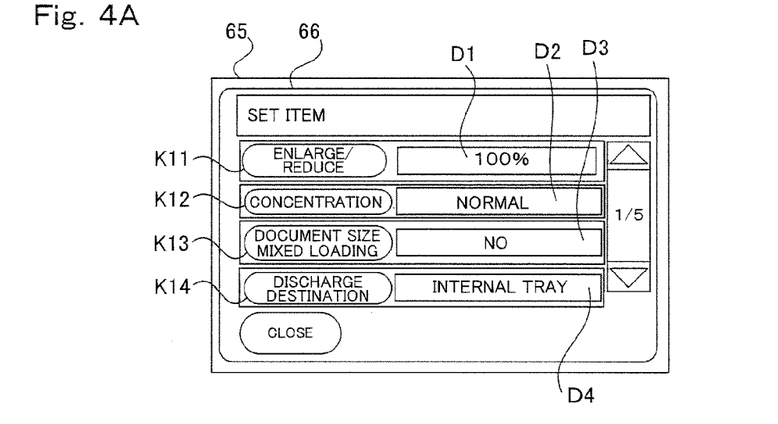
FIGS. 4A to 4C are views showing one example of a transition of a setting screen by a depression operation in an input content updating process.
Figure 4B:
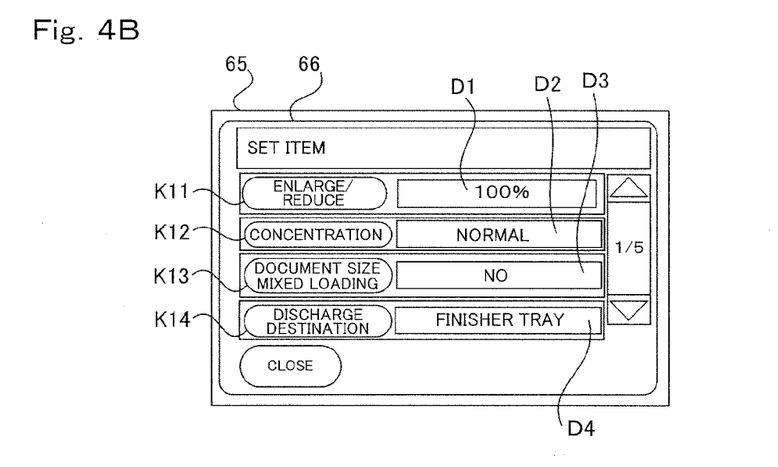
Figure 4C:
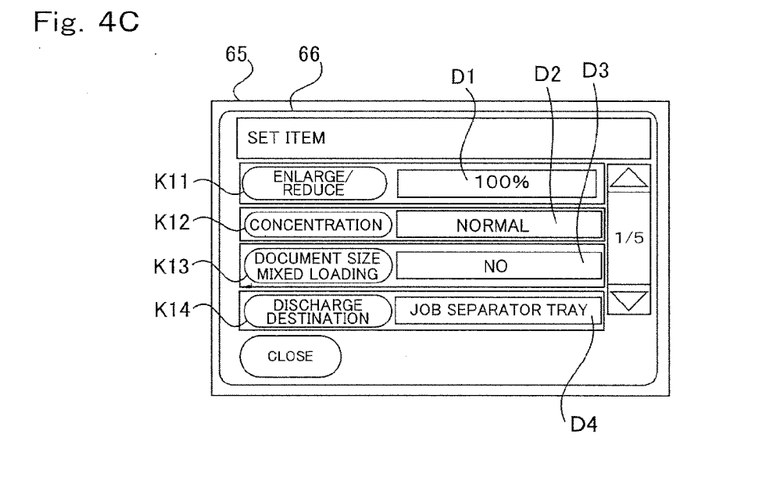

A setting screen 66 displayed on the touch panel 65 and the touch keys K11 to K14 which are subjects to be operated and displayed on the setting screen 66, when a user causes the multifunction peripheral 100 to copy will be described with reference to FIGS. 4A to 4C. The setting screen 66 is a screen for setting various printing conditions, such as "enlarge/reduce", involved with the copying operation, or for changing the setting. Examples of items that can be set on the setting screen 66 include "concentration", "document size mixed loading", and "discharge destination", in addition to "enlarge/reduce". The touch keys K11 to K14 that are the subjects to be operated and display windows D1 to D4 displaying a set content are displayed on the setting screen 66.

The touch key K11 is an "enlargement/reduction setting key" for changing the setting of the "enlarge/reduce" of a print image. The touch key K12 is a "concentration setting key" for changing the setting of the "concentration" of a print image. The touch key K13 is a "document size mixed loading setting key" for setting whether "document size mixed loading" is carried out or not. The setting of the "document size mixed loading" is setting about whether or not plural documents P of different sizes are set on the ADF 2. The touch key K14 is a "discharge destination setting key" for changing the setting of the "discharge destination" of a print product.

Plural input candidates to be inputted as set values are assigned to each of the touch keys K11 to K14. Specifically, as shown in an input candidate list in FIG. 5, plural magnifications are assigned to the touch key K11 as the input candidates. For example, as shown in a list L1, magnifications of "25%", "50%" ... "150%" are assigned to the touch key K11. Each magnification is the input candidate for the input content to be inputted as the set value. Notably, "100%" is set to the touch key K11 (enlargement/reduction setting key) as an initial value.

Figure 5:
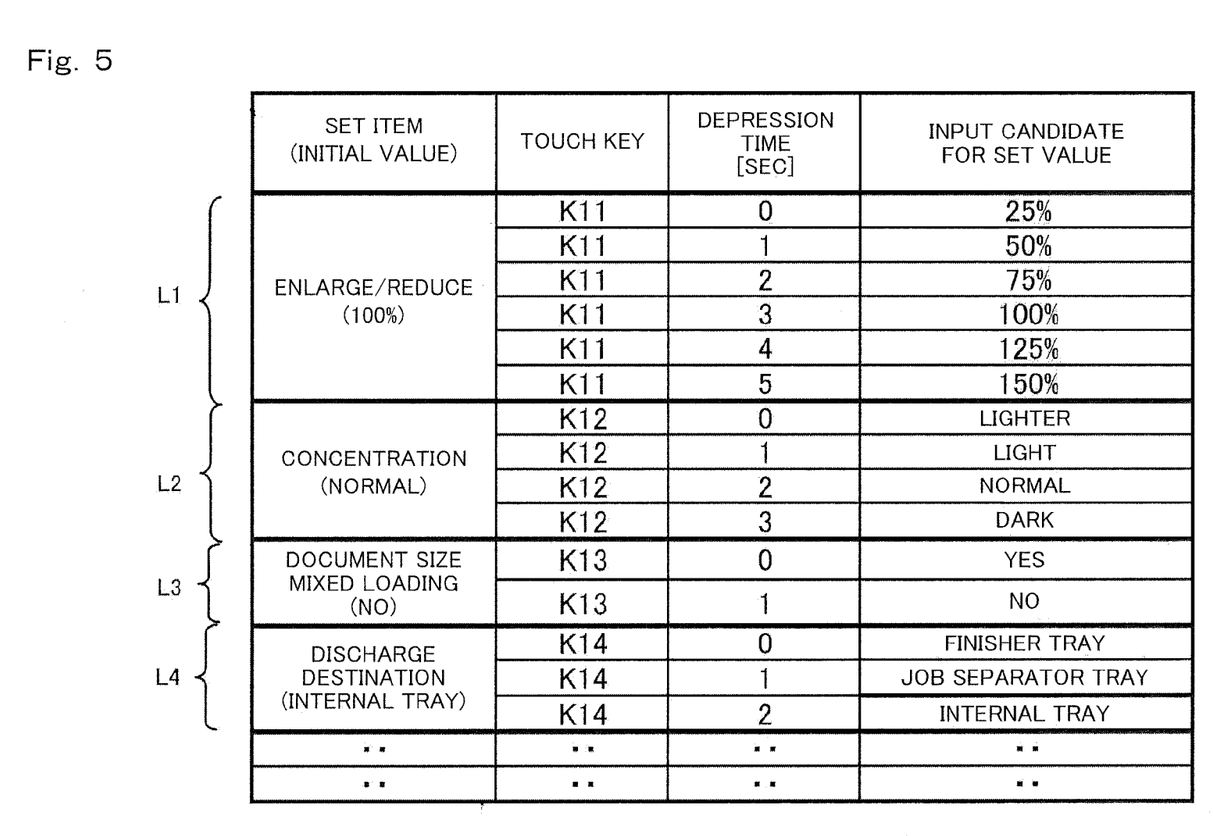
FIG. 5 is a view showing an input candidate list that is one example of a correspondence relation between a depression time of a touch key and an input candidate for a set value.

Similarly, plural concentration information pieces (see a list L2 in FIG. 5) are assigned to the touch key K12 as the input candidates, and "normal" is set as an initial value. These concentration information pieces are the input candidates for the input content to be inputted as the set value. Whether the document size mixed loading is carried out or not (see a list L3 in FIG. 5) is assigned to the touch key K13 as the input candidate, and "No" is set as an initial value. The information indicating whether the document size mixed loading is carried out or not is the input candidate for the input content to be inputted as the set value. The information of the discharge destination (see a list L4 in FIG. 5) is assigned to the touch key K14 as the input candidates, and an "internal tray" is set as an initial value. The information of the discharge destination is the input candidate for the input content to be inputted as the set value. The input candidate list shown in FIG. 5 is stored in a non-volatile storage medium, such as the ROM or the EEPROM in the main control portion 51, as table data.

In the present embodiment, the set content is changed according to the time during which the touch keys K11 to K14 are depressed by the user. When the touch key K11 keeps on being depressed after the depression of the touch key K11, the main control portion 51 updates the input candidate for the input content for changing the setting of the "enlarge/reduce" every 1 second. Specifically, when the touch key K11 is depressed, the main control portion 51 changes the input candidate to "25%" from "100%" that is the initial value. When the touch key K11 keeps on being depressed, the main control portion 51 updates the input candidate after 1 second to "50%", the input candidate after 2 seconds to "75%", the input candidate after 3 seconds to "100%", the input candidate after 4 seconds to "125%" . . . .

When the touch key K12 keeps on being depressed after the depression of the touch key K12, the main control portion 51 updates the input candidate for the input content for changing the setting of the "concentration" every 1 second. Specifically, when the touch key K12 is depressed, the main control portion 51 changes the input candidate from the "normal" that is the initial value to "lighter". When the touch key K12 keeps on being depressed further, the main control portion 51 updates the input candidate after 1 second to "light", the input candidate after 2 seconds to "normal", the input candidate after 3 seconds to "dark" . . . .

When the touch key K13 keeps on being depressed after the depression of the touch key K13, the main control portion 51 updates the input candidate for the input content for changing the setting of the "document size mixed loading" every 1 second. Specifically, when the touch key K13 is depressed, the main control portion 51 changes the input candidate to "YES" from "NO" that is the initial value. When the touch key K13 keeps on being depressed further, the main control portion 51 updates the input candidate after 1 second to "NO". The main control portion 51 also updates the input candidate after 2 seconds to "YES", which is the first item in the list L3.

When the touch key K14 keeps on being depressed after the depression of the touch key K14, the main control portion 51 updates the input candidate for the input content for changing the setting of the "discharge destination" every 1 second. Specifically, when the touch key K14 is depressed, the main control portion 51 changes the input candidate from the "internal tray" that is the initial value to a "finisher tray". When the touch key K14 keeps on being depressed further, the main control portion 51 updates the input candidate after 1 second to a "job separator tray", and updates the input candidate after 2 seconds to the "internal tray". The main control portion 51 also updates the input candidate after 3 seconds to the "finisher tray" that is the first item in the list L4.

In this way, the main control portion 51 selects an input candidate matching the depression time of each of the touch keys K1 to K14 based upon the input candidate list in FIG. 5.

<Operation Input Control Process>

An operation input control process executed on the operation display portion 6 by the main control portion 51 will be described with reference to FIGS. 4 to 7. In flowcharts shown in FIGS. 6 and 7, S1, S2 . . . , represent the numbers of steps in the processing procedure. The main control portion 51 during the execution of the operation input control process corresponds to a depression time detecting portion and an input determination portion according to the present disclosure.

The operation input control process is executed by the main control portion 51 according to a control instruction from the control portion 5, when an operation input by a user is needed in the multifunction peripheral 100. In the case where the user performs the operation input with the stand-by screen waiting for an user's operation request being displayed in the multifunction peripheral 100, the main control portion 51 executes the operation input control process, and sequentially changes its stand-by screen according to the operation input. The operation input control process executed by the main control portion 51 when the user changes the setting of the "discharge destination" based upon the input candidate list shown in FIG. 5 will be described here. Specifically, an example of a process of changing the "discharge destination" from an initial value (internal tray) by the user on the setting screen 66 displayed on the touch panel 65 (the LCD 62) according to the operation input control process will be described.

(Step S1)

In step S1, the main control portion 51 firstly determines whether or not the touch key is depressed based upon the depression signal inputted from the touch key input sheet 61. The main control portion 51 keeps on waiting until the touch key is inputted (NO in S1). On the other hand, when determining that the touch key is depressed from the touch key input sheet 61, the main control portion 51 moves the process to step S2 (YES in S1). In the description below, it is supposed that the touch key K14 corresponding to the "discharge destination" on the display screen is depressed.

(Step S2)

Next, in step S2, when the depression signal is inputted from the touch key input sheet 61, the main control portion 51 starts to count an elapsed time. The count of the elapsed time is continued until the depression signal from the touch key input sheet 61 to the main control portion 51 is lost. Specifically, the main control portion 51 is one example of the depression time detecting portion that detects the depression time based upon the depression signal from the touch key input sheet 61. The main control portion 51 executes the succeeding process based upon the counted elapsed time.

(Step S3)

Next, in step S3, the main control portion 51 executes an input content updating process while the input of the depression signal from the touch key input sheet 61 is continued. Specifically, the main control portion 51 determines the content regularly updated according to the depression time detected by the depression time detecting portion, as the input content. The detail of the input content updating process will be described later.

(Step S4)

After the input content updating process is ended, the main control portion 51 determines the input candidate upon losing the depression signal from the touch key input sheet 61, as the selected input content. Thereafter, in step S4, the main control portion 51 outputs the selected input candidate to the control portion 5 as the input content. The control portion 5 executes the process based upon the inputted input content.

<Input Content Updating Process>

Subsequently, the input content updating process (the step S3) executed by the main control portion 51 will be described with reference to FIG. 7. The input content updating process is executed while the depression signal from the touch key input sheet 61 is being detected by the main control portion 51, and is ended after the main control portion 51 loses the depression signal. Specifically, the input content updating process is of a kind of an interruption process executed by the main control portion 51 during the period from when the touch key input sheet 61 is depressed till it is no more depressed.

(Step S31)

In step S31, the main control portion 51 determines whether or not a predetermined update time has elapsed from when the depression signal from the touch key input sheet 61 has been inputted. The main control portion 51 keeps on waiting until the update time elapses (NO in S31). During this period, the main control portion 51 keeps on holding the input candidate before the update. On the other hand, when determining that the update time has elapsed, the main control portion 51 moves the process to step S32 (YES in S31). In the present embodiment, the update time is set as 1 second. For example, as shown in FIG. 5, the main control portion 51 sets the "finisher tray" as the input candidate, when the depression time of the touch key K14 is 0 to 1 second (see FIG. 4B). When the depression time is 1 to 2 seconds, the main control portion 51 sets the "job separator tray" (see FIG. 4C) as the input candidate, and when the depression time is 2 to 3 seconds, the main control portion 51 sets the "internal tray" (see FIG. 4A) as the input candidate.

(Step S32)

Next, in step S32, the main control portion 51 determines whether or not the input candidate before the update coincides with the last item in the list. When it is the last item in the list, the main control portion 51 moves the process to step S33 (YES in S32). When it is not the last item in the list, the main control portion 51 moves the process to step S34 (NO in S32). Specifically, in the case where the touch key K14 is depressed, the main control portion 51 determines whether the current input candidate coincides with the "internal tray" that is the last item in the list L4. In the description below, it is supposed that the main control portion 51 executes the process in accordance with the list L4.

(Step S34)

In step S34, the main control portion 51 sets the next item in the list L4 as the input candidate, and then moves the process to S35. Specifically, the main control portion 51 updates the input candidate to the "job separator tray", if the current input candidate is the "finisher tray", and updates the input candidate to the "internal tray", if the current input candidate is the "job separator tray", according to the list L4.

(Step S33)

In step S33, the main control portion 51 sets the first item in the list L4 as the input candidate, and then moves the process to S35. Specifically, the main control portion 51 updates the input candidate to the "finisher tray", if the current input candidate is the "internal tray", according to the list L4.

(Step S35)

In step S35, the main control portion 51 operates the LCD driver 52, the drive circuit 53, and the sound driver 54 based upon the input candidate list, and then, moves the process to S36.

The main control portion 51 causes the LCD 62 to display the current input candidate by the LCD driver 52. For example, when the touch key K14 keeps on being depressed, the main control portion 51 sequentially displays the "internal tray", the "finisher tray", the "job separator tray" . . . as the display content (visual information) corresponding to the "discharge destination" on the display window D4 of the LCD 62 as shown in FIGS. 4A to 4C.

The main control portion 51 also causes the speaker 64 to output sound of the input candidate by the sound driver 54. For example, when the touch key K14 keeps on being depressed, the main control portion 51 causes the speaker 64 to sequentially output sounds corresponding to the "internal tray", the "finisher tray", and the "job separator tray" . . . , which are the input candidates of the "discharge destination".

The main control portion 51 also vibrates the piezoelectric sheet 63 by the drive circuit 53 by the number of times of vibration corresponding to the current input candidate. For example, when the touch key K14 keeps on being depressed, the main control portion 51 vibrates the piezoelectric sheet 63 for 0.2 second, every time the input candidate of the "discharge destination" is sequentially updated to the "internal tray", the "finisher tray", the "job separator tray" . . . . Thus, the user can determine that the input candidate is the "finisher tray" just after the depression and before the vibration of the piezoelectric sheet 63. When the vibration of the piezoelectric sheet 63 for 0.2 second occurs once, the user can determine that the input candidate is the "job separator tray". Similarly, when the vibration of the piezoelectric sheet 63 for 0.2 second occurs twice, the user can determine that the input candidate is the "internal tray", and when the vibration of the piezoelectric sheet 63 for 0.2 second occurs three times, the user can determine that the input candidate is the "finisher tray". Even if the user cannot determine the input candidate, the user can recognize that the input candidate is changed by feeling the vibration. The main control portion 51 can notify the user of the input candidate for the set value selected based upon the input candidate list, by these plural sensing methods.

(Step S36)

Next, in step S36, the main control portion 51 determines whether the touch key K14 is no more depressed based upon the depression signal inputted from the touch key input sheet 61. When determining that the touch key K14 is depressed, the main control portion 51 moves the process to step S31 (NO in step S36). Specifically, the main control portion 51 continues to execute the process from the step S31 during the period when the touch key K14 is depressed. Hereafter, the main control portion 51 repeats the processes in steps S31 to S36 with the lapse of time until the depression signal from the touch key input sheet 61 is lost. On the other hand, when determining that the touch key K14 is no more depressed since the depression signal is lost, the main control portion 51 ends the input content updating process, and moves the process to step S4 (YES in S36). Specifically, the main control portion 51 is one example of the input determination portion that determines the content, which is regularly updated according to the depression time detected by the depression time detecting portion, as the input content. More specifically, the main control portion 51 selects the input content from the plural input candidates set beforehand according to the depression time detected by the depression time detecting portion.

In the embodiment described above, the process of changing the "discharge destination" has been described as one example. However, the present disclosure is applicable to the process of changing the setting of the "enlarge/reduce", the "concentration", and the "document size mixed loading" by the main control portion 51.

Effect of Embodiment

As described above, according to the operation display portion 6 according to the present disclosure, a user can confirm an input content visually, auditorily, and tactually, whereby the user can correctly input information. Since information is inputted based upon the content correctly confirmed by the user visually, auditorily, and tactually by the multifunction peripheral 100 provided with the operation display portion 6, an erroneous operation can be reduced. In addition, a user, irrespective of age or sex, can input information while easily confirming whether the operated content is correct or not by using the multifunction peripheral 100 provided with the operation display portion 6, the present disclosure is preferable from the viewpoint of universal design.

Other Embodiments of Present Disclosure

In the embodiment described above, the case where the piezoelectric sheet 63 vibrates once every update of the input candidate has been described as the vibration pattern for vibrating the piezoelectric sheet 63. However, the vibration pattern is not limited thereto. For example, it is conceivable that the piezoelectric sheet 63 vibrates more strongly at the timing when the input candidate is returned to the first item in the corresponding list (L1 to L4) upon updating the set value of any one of the items in the input updating process, than in the case where the input candidate is updated to the other one. According to this configuration, even if the input candidate makes one round due to the depression of the touch key for a long time, the user can recognize that the input candidate makes one round by feeling strong vibration. The user can also recognize the current input candidate by counting the number of times of vibration after sensing the strong vibration. Accordingly, the main control portion 51 can prevent the deviation between the updated input candidate and the input candidate recognized by the user as much as possible, when the user selects the input content from the input candidates only from the vibration.

It is also conceivable that, every time the input candidate is updated, the main control portion 51 gradually strengthens the vibration of the piezoelectric sheet 63 by the drive circuit 53. It is also conceivable that, every time the input candidate is updated, the drive circuit 53 vibrates the piezoelectric sheet 63 with a vibration pattern having a combination of a vibration with a short period and a vibration with a long period.

Various sounds are considered as the sounds corresponding to the input candidate and outputted from the speaker 64 by the main control portion 51 by use of the sound driver 54. For example, it is conceivable that, every time the input candidate is updated, the main control portion 51 causes the speaker 64 to output a beep with a tone corresponding to the input candidate, or causes the speaker 64 to output a voice of a number corresponding to the input candidate, during the input content updating process. It is also conceivable that, every time the input candidate is updated, the main control portion 51 causes the speaker 64 to output an item of the input candidate with a voice.

Figure 8:
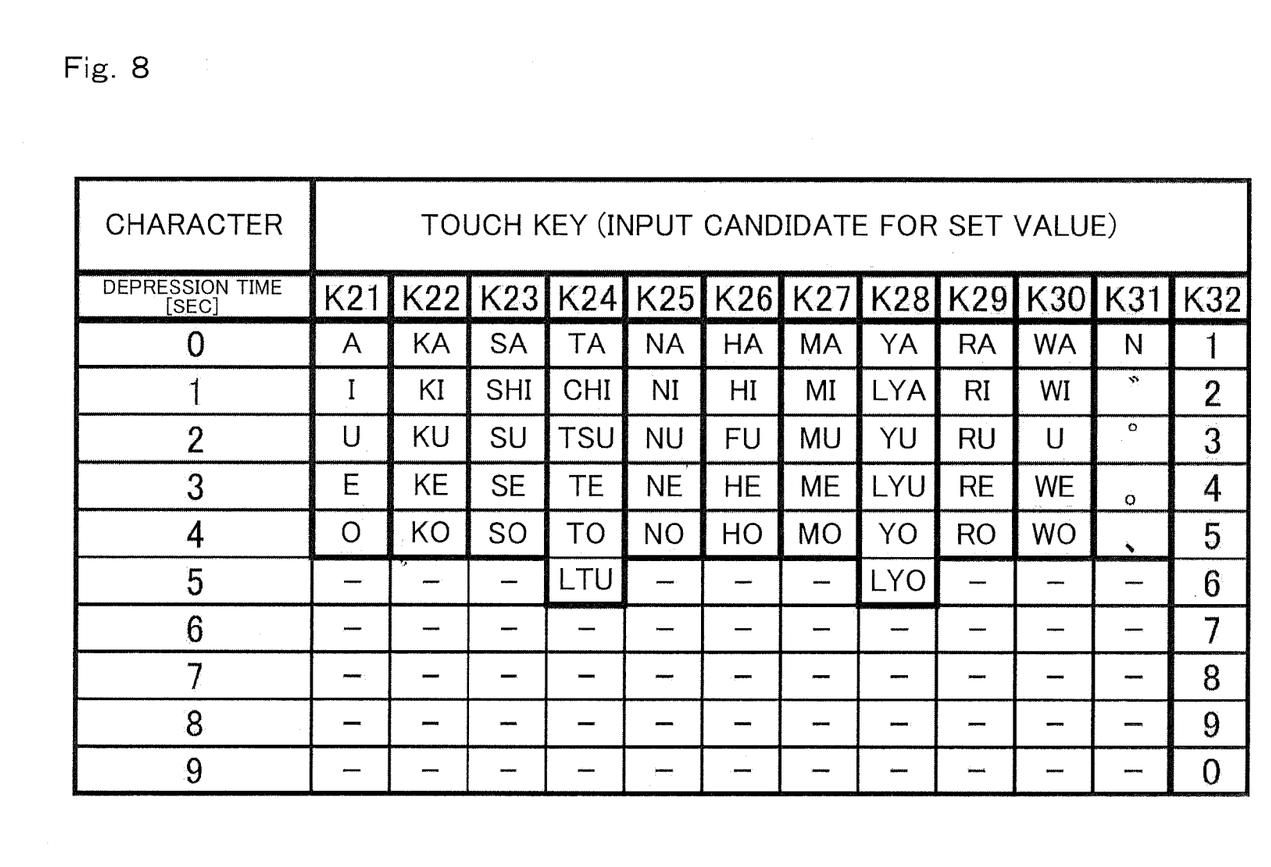
FIG. 8 is a diagram showing an input candidate list that is another example of a correspondence relation between a depression time of a touch key and an input candidate for a set value.

In the embodiment described above, the user changes the set content on the setting screen 66. However, the present disclosure is not limited thereto. For example, as shown in FIG. 8, the present disclosure is applicable to the case where a character input or numerical input is employed as the input candidate list. The main control portion 51 assigns input candidates of "a", "i", "u", "e", and "o" to the touch key K21 indicating Japanese "a" column. The main control portion 51 similarly assigns characters as the input candidates to touch keys K22 to K31 indicating Japanese "ka" column and succeeding columns. The main control portion 51 also assigns numbers such as "1", "2" . . . to a touch key K32 inputting a numerical value. The main control portion 51 also associates the depression time indicating the time during which each touch key is depressed, with an input candidate for a set value, based upon the input candidate list. In this case, the main control portion 51 determines that the input content is "a", "i", "u", "e", "o", "a", . . . according to the depression time of the touch key K21 after the touch key K21 is depressed. It is conceivable that information about input candidates corresponding to various characters, such as voiced sound, p-sound, contracted sound, extra sound, symbol (punctuation mark, middle point, question mark, etc.), alphabetical symbol, alphabet, and kanji, in addition to Japanese syllabary and numeric characters are stored in the input candidate list. With this, the main control portion 51 can select a character matching the input position (address information) and depression time detected by the touch key input sheet 61 based upon the input candidate list.

For example, a character might be inputted for each of various items, such as an E-mail address, an image storage folder name, a login user ID, or a login password, in the multifunction peripheral 100. Also in this case, the character input is executed by the operation display portion 6. When a user inputs a character on the multifunction peripheral 100, it is conceivable that the main control portion 51 allows the LCD 62 to display a software keyboard, and the user inputs characters from the touch key input sheet 61 according to the depression operation of each touch key in the software keyboard. If an area of the touch key input sheet 61 needed for the depression operation is small, the main control portion 51 allows the LCD 62 to display only the first characters, such as "a", "ka", "sa" ... of each touch key shown in FIG. 8 by the LCD driver 52. In this case, when the user depresses the touch key K21, the main control portion 51 sequentially updates the input candidate to "a", "i", "u" ... with the lapse of time. After the user stops the depression, the main control portion 51 selects the updated input candidate as the input content, and outputs the input content to the control portion 5. It is also conceivable that the main control portion 51 also allows the LCD 62 to display the input candidate, vibrates the piezoelectric sheet 63, and allows the speaker 64 to output sound.

In the embodiment described above, the input candidate is updated every 1 second of the depression time. However, the present disclosure is not limited thereto. For example, the operation display portion 6 is also used to input a number of copies in the multifunction peripheral 100. In this case, it is conceivable that the main control portion 51 updates the input candidate every 0.2 second of the depression time, when the touch key on the touch key input sheet 61 keeps on being depressed. In this case, every time the number of copies increases by 5, i.e., 5, 10, 15 ..., the main control portion 51 vibrates the piezoelectric sheet 63 and causes the speaker 64 to output beep. Thus, the user can confirm the input content, whereby the user can correctly input information in a short period.

Figure 9:
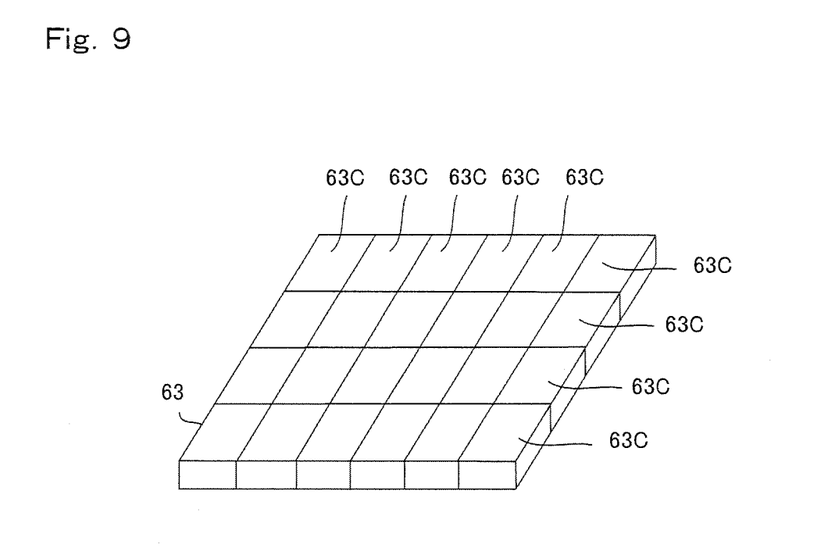
FIG. 9 is a view schematically showing a schematic configuration of a piezoelectric sheet according to another embodiment of the present disclosure.

In the embodiment described above, the piezoelectric sheet 63 uniformly vibrates the touch panel 65 (the touch key input sheet 61 and the LCD 62). However, the present disclosure is not limited thereto. For example, as shown in FIG. 9, it is conceivable that the piezoelectric sheet 63 vibrates the touch key input sheet 61 for each of plural input regions. Specifically, the piezoelectric sheet 63 is provided to positionally correspond to the whole detectable region on the touch key input sheet 61, and includes plural partial regions arranged in an array. In this case, the piezoelectric sheet 63 is formed by arranging plural partial piezoelectric sheets 63C in an array in the longitudinal direction and in the lateral direction, and plural drive circuits corresponding to the respective partial piezoelectric sheets 63C are provided. Each of the drive circuits for the partial piezoelectric sheets 63C is individually connected to the main control portion 51. When a signal is inputted from the main control portion 51, each of the drive circuits applies a voltage to each of the partial piezoelectric sheets 63C, thereby vibrating only the partial region in which the touch panel 65 (the touch key input sheet 61 and the LCD 62) is depressed by the partial piezoelectric sheet 63C. Thus, when plural touch keys on the touch key input sheet 61 are simultaneously depressed, the main control portion 51 vibrates only the touch key to which the operation input control process is executed, whereby the user is easy to determine the touch key to which the operation input control process is executed.

It is also conceivable that the main control portion 51 detects the depression of plural touch keys, and when the operation input control process corresponding to the depression of the plural keys is executed, the main control portion 51 vibrates all of the plural touch keys. Thus, the user is easy to determine the depressed plural touch keys.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation input device comprising:
    a touch panel configured to output a depression signal according to a depression time when an input region is depressed;
    a depression time detecting portion configured to detect the depression time based upon the depression signal from the touch panel;
    an input determination portion configured to determine an input content according to the depression time detected by the depression time detecting portion, the input content being updated every time a predetermined update time elapses while the input region is depressed;
    a display control portion configured to, every time the predetermined update time elapses while the input region is depressed, output visual information, which corresponds to the input content determined by the input determination portion, to a display portion of the touch panel;
    a sound control portion configured to, every time the predetermined update time elapses while the input region is depressed, output sound corresponding to the input content determined by the input determination portion;
    a vibration portion configured to transmit vibration to the touch panel, every time the predetermined update time elapses while the input region is depressed; and
    a vibration control portion configured to, every time the predetermined update time elapses while the input region is depressed, vibrate the touch panel by the vibration portion according to a vibration pattern corresponding to the input content determined by the input determination portion.

2. The operation input device according to claim 1, wherein the input determination portion selects the input content from plural input candidates set beforehand according to the depression time detected by the depression time detecting portion.

3. The operation input device according to claim 2, wherein the touch panel outputs, together with the depression signal, address information indicating an input position that is depressed for each input region, and
    the input determination portion selects the input content, according to the depression time, from the plural input candidates corresponding to the input region specified by the address information.

4. The operation input device according to claim 2, wherein the vibration control portion vibrates the touch panel by the vibration portion, every time the input content is selected by the input determination portion.

5. The operation input device according to claim 3, wherein the vibration control portion vibrates the touch panel by the vibration portion, every time the input content is selected by the input determination portion.

6. The operation input device according to claim 2, wherein the display control portion outputs the visual information to the display portion of the touch panel, every time the input content is selected by the input determination portion.

7. The operation input device according to claim 2, wherein the sound control portion outputs sound, every time the input content is selected by the input determination portion.

8. The operation input device according to claim 1, wherein
the vibration portion vibrates the touch panel for each of the plural input regions, and
the vibration control portion vibrates only the input region where the touch panel is depressed, by the vibration portion.

9. An information processing apparatus comprising:
a touch panel configured to output a depression signal according to a depression time when an input region is depressed;
a depression time detecting portion configured to detect the depression time based upon the depression signal from the touch panel;
an input determination portion configured to determine an input content according to the depression time detected by the depression time detecting portion, the input content being updated every time a predetermined update time elapses while the input region is depressed;
a display control portion configured to, every time the predetermined update time elapses while the input region is depressed, output visual information, which corresponds to the input content determined by the input determination portion, to a display portion of the touch panel;
a sound control portion configured to, every time the predetermined update time elapses while the input region is depressed, output sound corresponding to the input content determined by the input determination portion;
a vibration portion configured to, every time the predetermined update time elapses while the input region is depressed, transmit vibration to the touch panel; and
a vibration control portion configured to, every time the predetermined update time elapses while the input region is depressed, vibrate the touch panel by the vibration portion according to a vibration pattern corresponding to the input content determined by the input determination portion.

10. The information processing apparatus according to claim 9, wherein the input determination portion selects the input content from plural input candidates set beforehand according to the depression time detected by the depression time detecting portion.

11. The information processing apparatus according to claim 10, wherein
the touch panel outputs, together with the depression signal, address information indicating an input position that is depressed for each input region, and
the input determination portion selects the input content, according to the depression time, from the plural input candidates corresponding to the input region specified by the address information.

12. The information processing apparatus according to claim 10, wherein the vibration control portion vibrates the touch panel by the vibration portion, every time the input content is selected by the input determination portion.

13. The information processing apparatus according to claim 11, wherein the vibration control portion vibrates the touch panel by the vibration portion, every time the input content is selected by the input determination portion.

14. The information processing apparatus according to claim 10, wherein the display control portion outputs the visual information to the display portion of the touch panel, every time the input content is selected by the input determination portion.

15. The information processing apparatus according to claim 10, wherein the sound control portion outputs sound, every time the input content is selected by the input determination portion.

16. The information processing apparatus according to claim 9, wherein
the vibration portion vibrates the touch panel for each of the plural input regions, and
the vibration control portion vibrates only the input region where the touch panel is depressed, by the vibration portion.

* * * * *